United States Patent [19]
DeRoo et al.

[11] Patent Number: 5,182,752
[45] Date of Patent: Jan. 26, 1993

[54] METHOD AND APPARATUS FOR TRANSFERRING DATA BETWEEN A DATA BUS AND A DATA STORAGE DEVICE

[75] Inventors: John E. DeRoo, Marlborough; Robert C. Frame, Westboro; Ann Solli, Framingham, all of Mass.

[73] Assignee: Digital Equipment Corporation, Maynard, Mass.

[21] Appl. No.: 545,860

[22] Filed: Jun. 29, 1990

[51] Int. Cl.⁵ .............................................. G06F 11/10
[52] U.S. Cl. ................................... 371/37.7; 371/50.1
[58] Field of Search ................. 371/40.1, 51.1, 37.7, 371/50.1

[56] References Cited
U.S. PATENT DOCUMENTS
4,965,801 10/1990 DuLac ................................. 371/40.1

Primary Examiner—Stephen M. Baker
Attorney, Agent, or Firm—Cesari and McKenna

[57] ABSTRACT

A bus interface between a data bus and data-storage devices provides error protection for multi-byte data packets received from the bus and intended for storage on an associated storage device by checking a packet for errors using check sum symbols and parity bits in the packet. The bus interface then (i) encodes a predetermined number of data symbols to generate error detection symbols, (ii) again checks the data symbols for errors using the parity bits, and (iii) stores the data and associated error detection symbols in one of the series of linked buffers. Each buffer holds enough to fill one storage unit, or sector. A storage interface later retrieves the buffered data and error detection symbols, combines them with the address of a designated storage sector, and encodes the symbols to generate error correction symbols. It then stores the encoded data, and error detection and correction symbols in the designated sector. When the storage interface later retrieves the symbols from the sector, it corrects errors in the data using the retrieved error correction symbols. It next removes the sector address from the error detection symbols and returns the data and error detection symbols to the bus interface. The bus interface (i) generates parity bits, (ii) checks for errors using the error detection symbols, (iii) generates check sum symbols and (iv) transmits the data, check sum and parity symbols over the bus. If the bus interface at any time detects an error, it stops the data transfer operation.

16 Claims, 8 Drawing Sheets

METHOD AND APPARATUS FOR TRANSFERRING DATA BETWEEN A DATA BUS AND A DATA STORAGE DEVICE

FIELD OF THE INVENTION

This invention relates generally to error protection of data and more specifically to a method and apparatus for protecting data from errors which occur as data is being transferred between a data bus and associated storage devices.

BACKGROUND OF THE INVENTION

A data bus transmits data to and from computing elements and data storage devices using, for error protection, parity bits and check sum symbols. These parity bits and check sum symbols enable the systems to detect all single, double and triple bit transmission error patterns and some patterns with four or more erroneous bits.

Data on the bus is in the form of data bytes (8-bits), and each data byte has associated with it a parity bit. The data bytes and parity bits are transmitted in multiple-byte packets. The packets contain, in addition to the data bytes and parity bits, an associated check sum symbol. The parity bits and the check sum symbol provide what is commonly referred to as "horizontal" and "vertical" parity, respectively. These terms are associated with a conceptual configuration of a packet as a one-byte wide and "n"-byte long block of data, where n is the number of bytes in the packet.

Using prior technology, when an interface between the data bus and the storage devices receives a data packet over the bus for storage on the associated storage device, it checks the individual bytes and the entire packet for errors using the parity bits and the check sum symbol, respectively. If there are no detectable errors, the interface converts the bytes to words and buffers the data words in an associated buffer in random access memory (RAM).

The interface then (i) retrieves from the RAM an appropriate number of data bytes to fill one storage unit on the storage medium, for example, 512 bytes to fill a magnetic disk sector, (ii) encodes the converted data to generate error correction code symbols using an error correction code, and, finally, (iii) sends the data and the error correction symbols as analog signals to the storage device. The interface may also encode the data words and the error correction code symbols to facilitate later demodulation of the stored symbols using, for example, a $ code.

Errors may be introduced into the data bytes between the time they are found to be error free using the parity bits and the check sum symbol and the time they are encoded using the error correction code. For example, as the error-free data are being transferred to the buffer for pre-encoded storage, they may be sent over one or more faulty connections and arrive at the buffer with one or more errors. The interface encodes this erroneous data to generate corresponding error correction symbols and sends them to the storage medium for recording thereon. When the data and error correction code symbols are later retrieved from the storage medium, the interface uses the error correction symbols to correct the data to the pre-encoded state, that is, to the erroneous state in which they arrived at the buffer. It then sends the erroneous data to a requesting device as "error-free" data. What is needed is a mechanism to protect the data from such errors.

SUMMARY OF THE INVENTION

The invention is a bus interface, which connects to both the data bus and a storage interface, and provides error protection for data from the time it receives data over the data bus until the time it returns the data to the data bus for transmittal to a requesting device. The invention also includes a method of operating the bus interface such that the error protection stays with the data as they travel through the interface to the storage medium and from the storage medium back through the interface to the data bus. If errors are found at any point, the bus interface interrupts the data transfer operation.

The method is summarized as follows. When the bus interface receives a data packet from the data bus it determines if the packet and the individual data bytes therein are free of errors detectable by means of the received parity bits and check sum symbol. If the interface does not detect any errors in the received data bytes it converts the data bytes to two-byte data words and associates with each word the two received parity bits formerly associated with the data bytes. Next, using an error detection code (EDC), the interface encodes the data words in groups which are a predetermined number of words long, and generates for each group a number of EDC symbols. The bus interface retains the associated parity bits, but does not encode them.

After the encoding, the interface again checks each of the encoded data words for errors using the retained parity bits. If the data words contain errors, the bus interface interrupts the data transfer operation. However, if the data words are still error-free, the interface sends the various groups and the associated EDC symbols to a series of "linked" buffers, with each group being stored in a single buffer. The buffers are linked by pointers, each of which points from a buffer associated with earlier received data to a next buffer associated with later received data. Each of the buffers holds the amount of data required for one section of the storage medium, for example, the data for one disk sector, where the data consists of data words and associated EDC symbols.

After the packet data are stored in the linked buffers, a microprocessor retrieves the EDC symbols from each of the buffers associated with the packet and encodes them by combining them with the address of the disk sector which is designated to store the associated data. Thereafter, the storage interface encodes the data, that is, the data words and the encoded EDC symbols, using an error correction code (ECC), and generates a predetermined number of ECC symbols. It then sends the data and the ECC symbols to the storage device.

When the data and ECC symbols are later retrieved from the storage device and returned to the storage interface, the interface uses the retrieved ECC symbols to correct the data, as necessary. It then sends the data to the buffers. Next, the microprocessor retrieves the EDC symbols from the buffers, combines them with the address of the designated sector and returns them to the buffer. If the storage device retrieved the data from the wrong sector, the combining of the designated sector address with the retrieved EDC symbols introduces into the EDC symbols one or more errors which will be detected by the bus interface.

The bus interface then retrieves the data from the buffer and reverses the error protection routine it went through to prepare the data for storage. The bus interface thus (i) generates parity bits for each of the retrieved data words, (ii) uses the retrieved EDC symbols to determine if there are errors in the data words, (iii) converts the data words to data bytes and associates one of the generated parity bits with each of the bytes, and (iv) generates a check sum symbol for the packet. If the bus interface detects an error at any point it stops the data transfer operation and interrupts the microprocessor.

If the bus interface does not detect any errors, it sends over the bus the data bytes, in the form of a packet. While it is sending the packet, the bus interface performs one more error detection operation to ensure that the connections between the interface and the bus have not introduced errors into the data. The bus interface thus reads back the data it sends, and compares them with the corresponding data bytes and parity bits it tried to send. If everything matches, the transmission is error-free. Otherwise, the bus interface interrupts the data transfer operation.

BRIEF DESCRIPTION OF THE DRAWINGS

The above and further advantages of the invention may be better understood by referring to the following description in conjunction with the accompanying drawings, in which.

DETAILED DESCRIPTION

Figure 1:
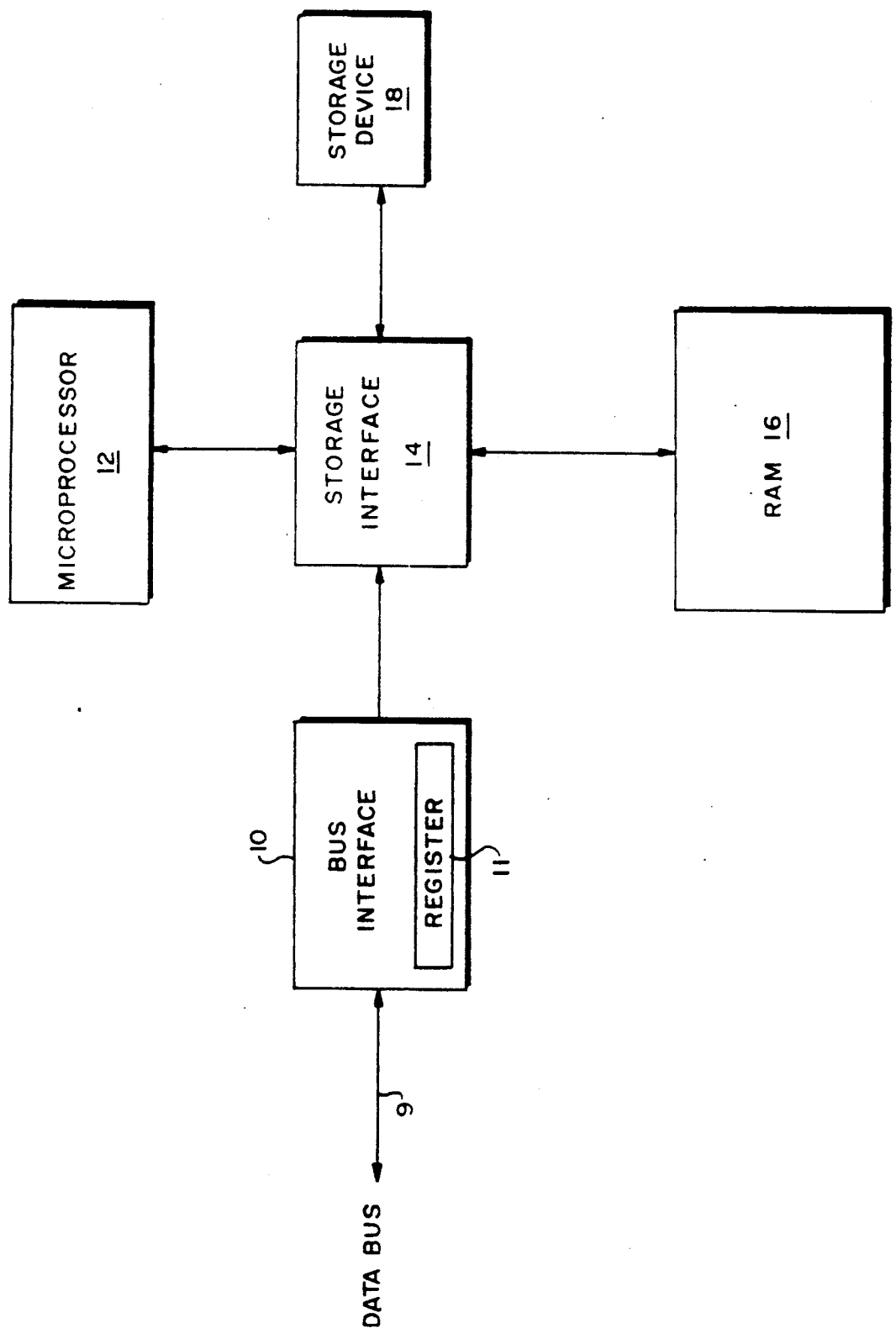
FIG. 1 is a block diagram of a data bus, an associated data storage device and the interfaces between them.

FIG. 1 depicts, in block diagram form, a data bus 9, a mass storage device 18 and the interfaces 10 and 14 between them. The bus interface 10 and the storage interface 14 facilitate the transfer of data between the bus and the storage device 18, under the control of a microprocessor 12.

The bus interface 10 receives data from the bus and transmits data to the bus in the form of multi-byte packets. Each packet also contains a number of parity bits, one for each data byte, and a check sum symbol for error protection, as well as a packet header which includes packet specific information such as the source and destination of the packet, the length of the packet, and so forth.

When the bus interface 10 receives a packet from the bus for storage on the associated storage device 18, it checks the data bytes for errors using the parity bits and check sum symbol by means of conventional techniques. While it is checking the packet for errors using the check sum, it also converts the data bytes to two-byte words and encodes a predetermined number of them, using an error detection code EDC, to generate EDC symbols. It then checks the words which it encoded for errors using the two associated parity bits received on the data bus 9. Next, it sends the data words and associated EDC symbols to one or more buffers in a series of "linked" buffers in RAM 16. Thus the bus interface 10, under the control of the microprocessor 12, sends the data through the storage interface 14 to designated buffer(s) in the RAM 16. Each of the linked buffers holds one storage unit of data, for example, one sector of data, where the data includes both the data words and the EDC symbols. The operation of the linked buffers is discussed in more detail with reference to FIG. 5 below.

When the bus interface 10 completes the transfer of data to the RAM 16, it sends an interrupt to the microprocessor 12. The microprocessor 12 then retrieves the EDC symbols from the buffers and encodes the symbols by combining them with the addresses of the various sectors on the storage device which are designated to store the data. The microprocessor 12 thus exclusive-ORs the EDC symbols in the first buffer associated with the packet with the address symbols associated with the first sector designated to store the data and returns the resulting symbols to the appropriate buffer. It then exclusive-ORs the EDC symbols from the next buffer with the address symbols associated with a next sector and returns the resulting symbols to the buffer, and so forth.

When the storage device 18 is ready for the data, the storage interface 14 retrieves the data from RAM 16, encodes it using an error correction code (ECC), and generates corresponding ECC symbols. Next, it transfers the data words, encoded EDC symbols and ECC symbols to the storage device 18. The storage device 18, using write heads (not shown), then records the data and associated symbols in the appropriate sector, or section, of the storage medium.

The bus interface 10 provides error protection for data from the time it receives the data from the data bus. This error protection follows the data to the storage medium and back to the bus interface 10. Thus it protects the data from errors which are caused by faulty connections, wires, etc. in the storage interface 12, the associated RAM 16 and/or connections between them. This error protection, together with the ECC protection provided by the storage interface 14, ensures that only error-free data from the appropriate sector are transferred to the data bus 9. The bus interface 10 detects these types of errors in data retrieved from storage by reversing the operations set forth above, as discussed in more detail below with reference to FIGS. 4A and 4B.

Figure 2:
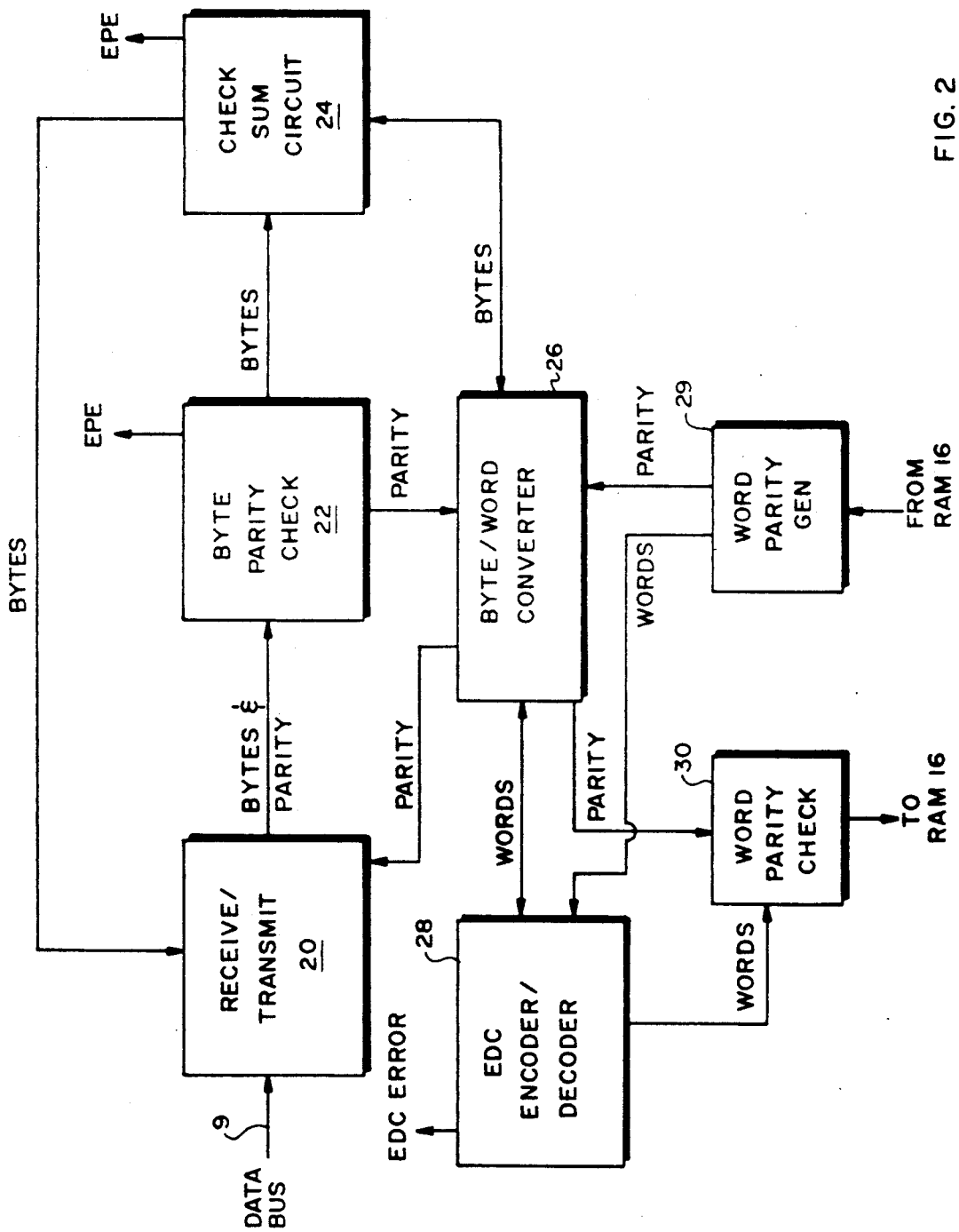
FIG. 2 is a block diagram of a bus interface shown in FIG. 1.
Figure 3A:
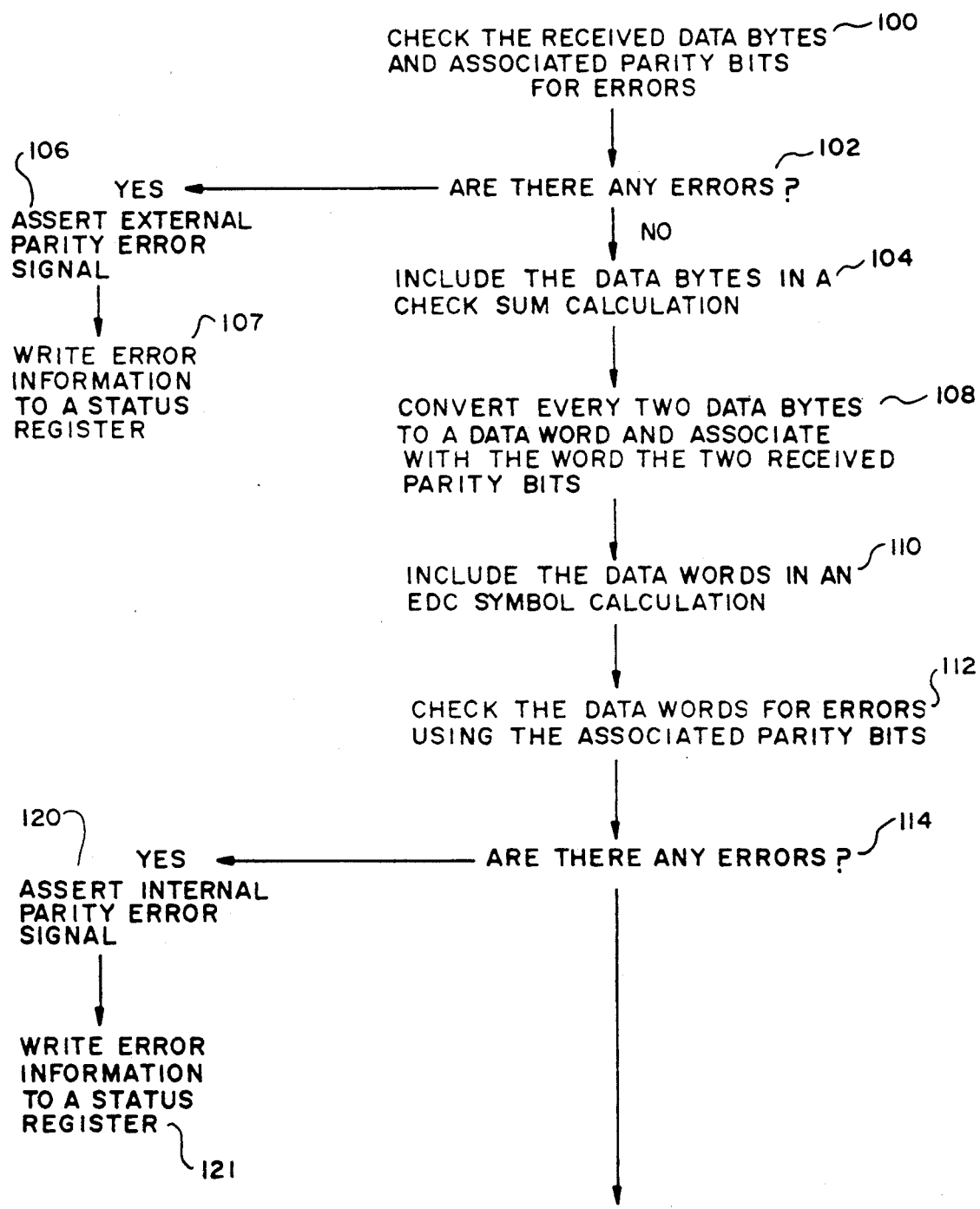
FIG. 3A is a flow chart of the operations of the bus interface in transferring data from the bus to a storage interface.
Figure 3A:
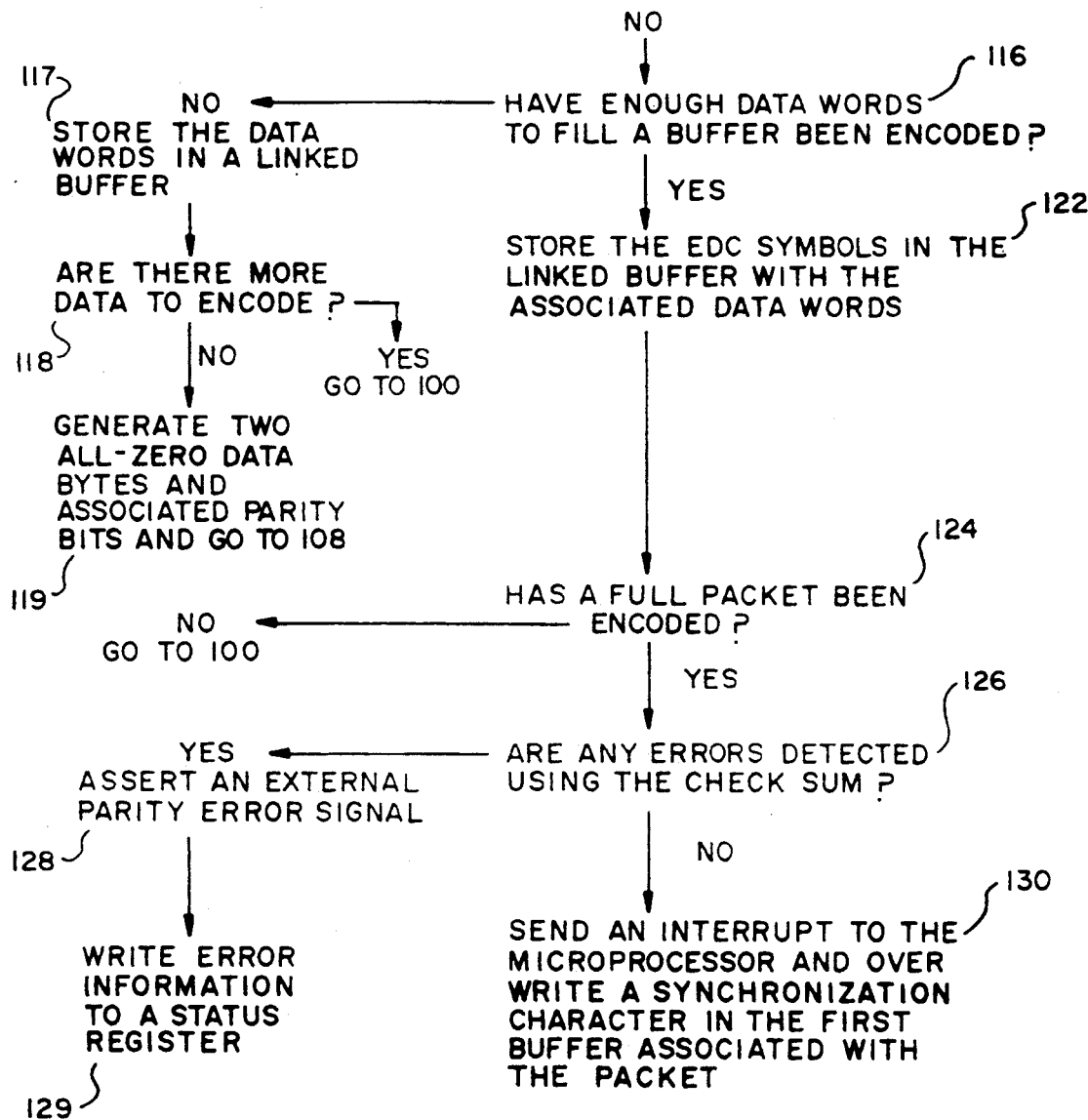
Figure 3B:
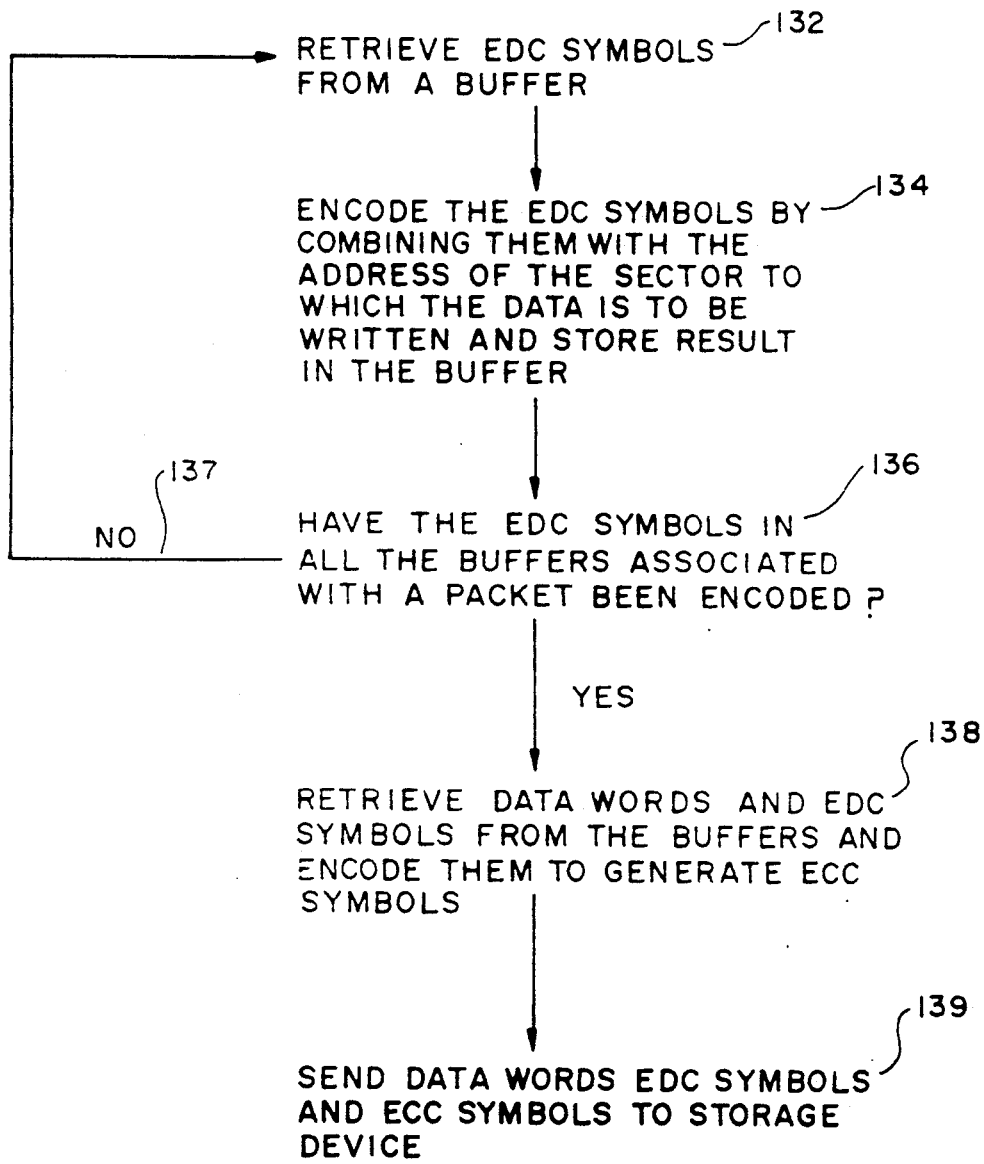
FIG. 3B is a flow chart of the operations of the storage interface in transferring data to the storage device.

FIG. 2 depicts the bus interface 10 in more detail. The bus interface 10 includes in a receive path a receive/transmit circuit 20, a byte parity-checker 22, a check sum circuit 24, a byte/word converter 26, an EDC encoder/decoder 28, and a word parity-checker 30. With reference also to FIGS. 3A and 3B, when the receive/transmit circuit 20 receives a data packet over the data bus it sends each data byte and associated parity bit to byte parity-checker 22 as it receives them. Byte parity-checker 22 uses the received parity bit to check the data byte for errors (Steps 100–102). If the byte parity checker 22 determines that the parity is not correct for a given byte, it asserts an "external parity error" (EPE) signal, which interrupts the microprocessor 12 and stops the data transfer operation. The bus interface 10 also stores in an internal status register 11 an indication that it detected a data byte parity error (Steps 106-107). The microprocessor 12 later retrieves the information in register 11 when it responds to the interrupt signal.

If the parity of a given data byte is correct, the parity checker 22 sends the data byte to the check sum circuit 24 and the associated parity bit to byte/word converter 24. The check sum circuit 24 includes the data byte in its check sum calculation and then sends the byte to the byte/word converter 26 (Step 104). When the converter 26 receives two data bytes, it converts the bytes to a word, sends the two parity bits associated with that word to the word parity-checker 30, and sends the word to EDC encoder/decoder 28 (Steps 108-110). As is understood by those skilled in the art, the converter 26 converts the data bytes to the format required by the storage devices 18. If, for example, the devices 18 required 32-bit words, the converter 26 would convert four data bytes to a 32-bit word and associate with the word the four parity bits associated with the individual bytes.

The EDC encoder/decoder 28 includes the word in its EDC symbol generation and sends the word to the data word parity checker 30. The word parity-checker 30 then uses the parity bits it received from the converter 26 to check the word it received from the encoder/decoder 28 for errors. If it does not detect any errors, it sends the word to a designated buffer in RAM 16 (Steps 112, 114-117). When a sufficient number of data words have passed through the EDC encoder/decoder 28, the encoder/decoder sends to the particular RAM buffer which is holding the data words a number of associated EDC symbols (Steps 116, 122). If the word parity-checker 30 finds an error in any data word it asserts an "internal parity error" (IPE) signal, which interrupts both the microprocessor 12 and the data transfer operation. The bus interface 10 then stores information relating to the IPE in its status register 11 (Steps 120-121).

As the bus interface 10 receives more of the packet, it generates additional EDC symbols and fills additional buffers in RAM 16. Once a complete packet is received, the check sum circuit 24 determines if the vertical parity is correct (Steps 124-126). If it is, the check sum circuitry 24 leaves de-asserted the EPE signal. Otherwise, it asserts the EPE signal, which interrupts the microprocessor 12 and stops the data transfer operation, and stores the appropriate information in its status register 11 (Steps 128-129).

If the packet does not contain enough data to fill all of the buffers to which the data are sent, the bus interface 10 zero-fills the remaining locations in the last buffer associated with the packet (steps 118-119). The bus interface 10 thus generates an appropriate number of all zero data bytes and associated parity bits, converts the bytes to words and includes them in the EDC. It then sends the data and associated EDC symbols to the buffer. In this way, the bus interface protects the buffered data from errors which change all-zero filler symbols to non-zero symbols which may be mistaken as data. The bus interface thus sends to the buffers a number of complete sectors of data, and eliminates the need for the storage interface 14 or microprocessor 12 to generate zero-fill symbols in order to fill completely each designated sector of the storage medium. The storage device 18 must receive a full sector of data from the storage interface 14, because it can only "write" data to the storage medium in complete sector units.

When the entire packet has been sent to RAM 16, the bus interface 10 sends an interrupt to the microprocessor 12 (Step 130). The microprocessor 12 thereafter retrieves from the first buffer associated with the packet the EDC symbols and encodes them by combining them with the address of the storage medium sector designated to store the data and returns the encoded EDC symbols to the buffer (Steps 132-134). The microprocessor 12 then repeats the encoding for each buffer, using appropriate sector addresses (Steps 136-137).

Thereafter, when the storage device 18 is ready to record the data, the storage interface 14 retrieves the data from the buffers, encodes it using an ECC and generates ECC symbols (Step 138). Finally, it sends the data and associated symbols to the storage device 18 (Step 139). The storage interface 14 may also encode the data to facilitate later demodulation using, for example, a $ code, as appropriate.

Figure 4A:
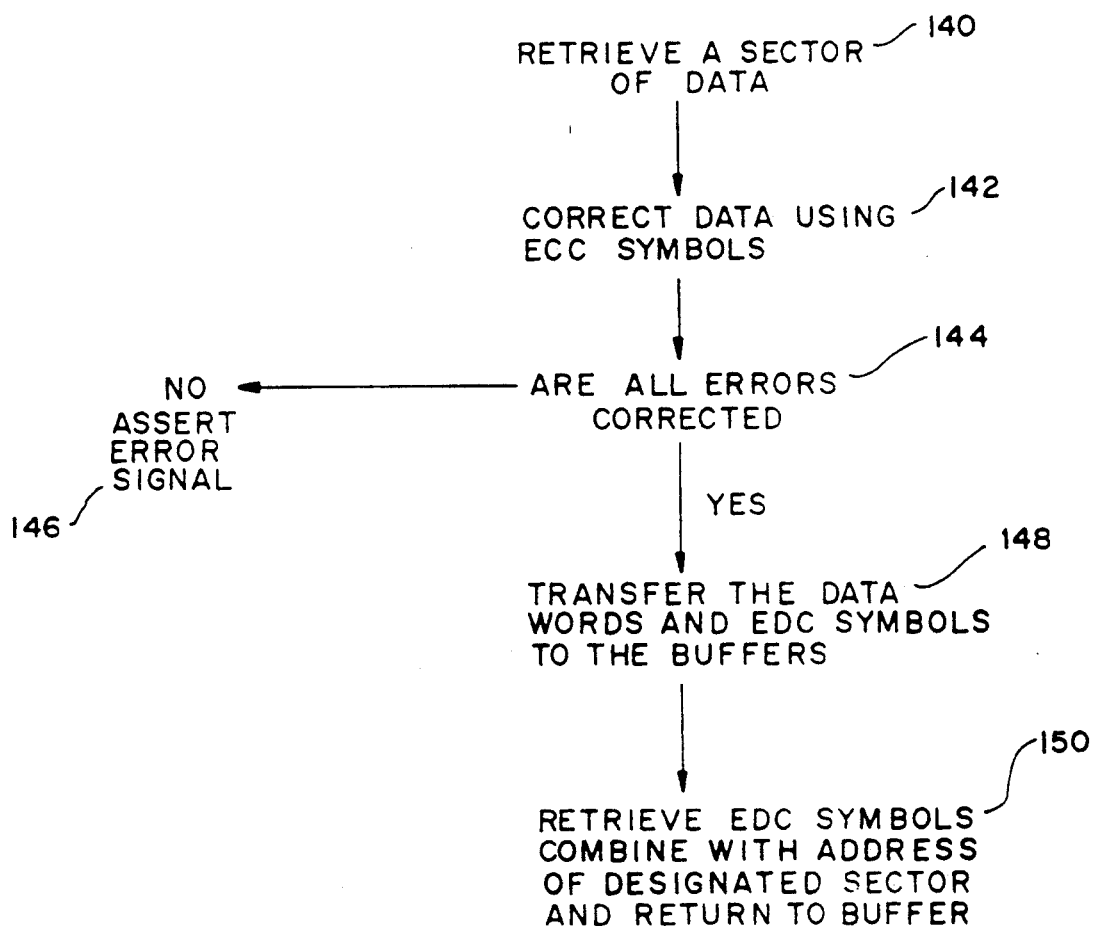
FIG. 4A is a flow chart of the operations of the storage interface in transferring data from the storage device to the bus interface.
Figure 4B:
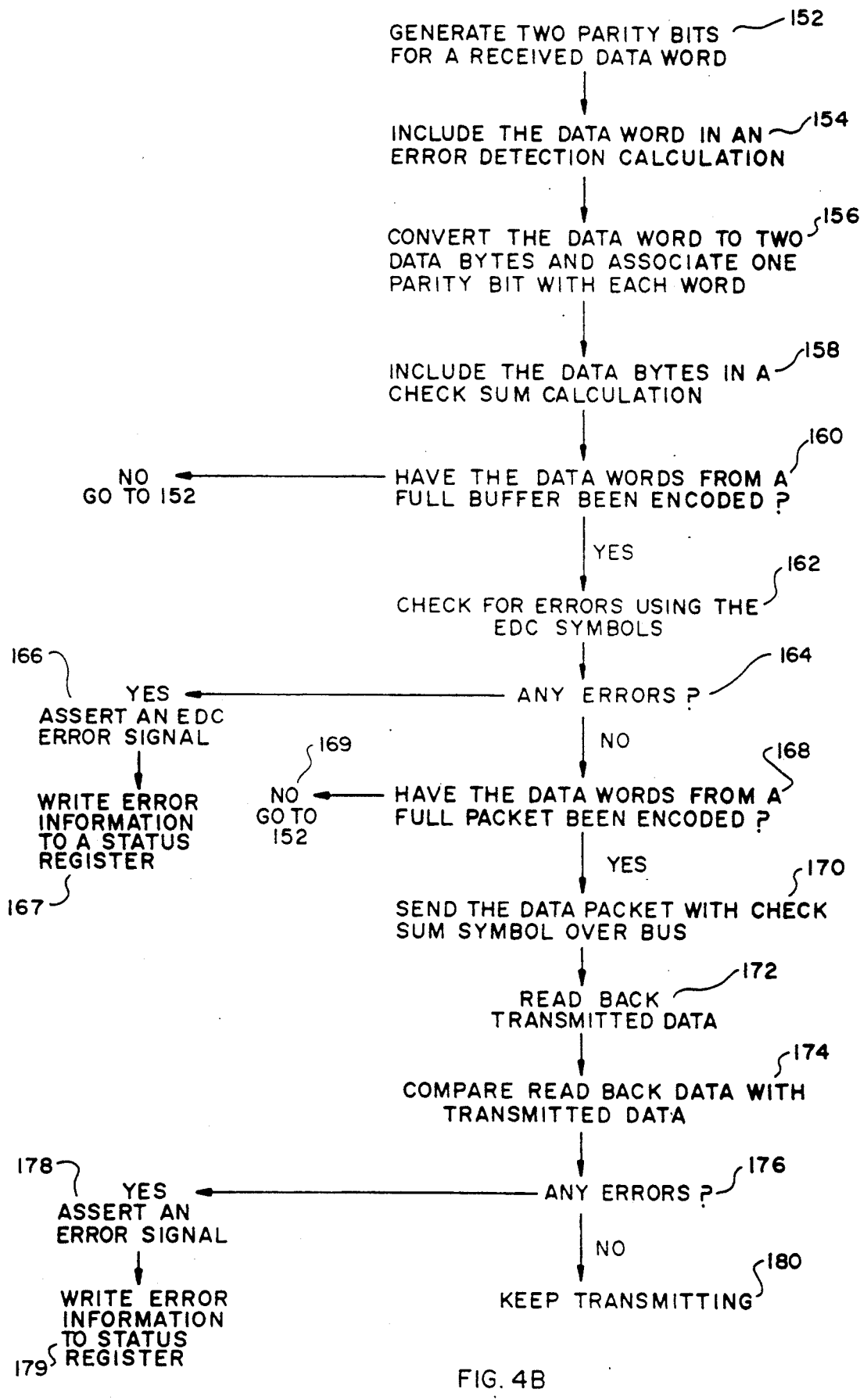
FIG. 4B is a flow chart of the operations of the bus interface in transferring data to the data bus.

Referring now also to FIGS. 4A and 4B, when data is retrieved from storage, the storage interface 14 decodes the data using the retrieved ECC symbols and accumulates in RAM 16 a sector of data (steps 140-148). The data includes data words and EDC symbols, and the ECC syndromes symbols generated by the decoding. Using the buffered ECC syndrome symbols and conventional error correction mechanisms (not shown), the storage interface 14 and/or the microprocessor 12 corrects errors in the retrieved data (Step 142). If all the errors cannot be corrected, the microprocessor 12 stops the data transfer operation and indicates to a system controller that an error has been detected (Steps 144-146). The controller can then either try to re-read the sector or cancel the data transfer operation all together, as appropriate.

If all the detectable errors in the data are corrected, the microprocessor 12 retrieves from the buffer the EDC symbols, exclusive-OR's them with the address of the sector from which the storage device 18 was supposed to have retrieved the data and returns the resulting symbols to the buffer (Step 150). It thus introduces errors into the EDC symbols if the data was read from the wrong sector, or if the data was previously written to the wrong sector, that is, the sector contains data intended for a different sector, and prevents the otherwise error-free, but still incorrect, data from being sent to the data requesting device.

The bus interface 10 retrieves the data from the buffer and generates, for each data word, two parity bits in word parity-generator 29 (Step 152). Next, it sends the data word to EDC encoder/decoder 28 and the parity bits to byte/word converter 26. The EDC encoder/decoder 28 includes the data word in its EDC decoding and sends the word to the converter 26 (Steps 154).

The byte/word converter 26 converts the data word to two data bytes and associates with each byte one of the generated parity bits (Step 156). It then sends the bytes to check sum circuit 24 and the parity bits to the receive/transmit circuit 20. The check sum circuit 24 includes the data bytes in its check sum calculations and sends the bytes to the transmit circuit 20 to join their parity bits (Step 158).

After a full buffer of received data words and EDC symbols have been sent through the EDC encoder/decoder 28, the encoder/decoder uses the retrieved EDC symbols to determine if the data is still error-free (Steps 160-164). If they are, the encoder/decoder leaves de-asserted an "EDC error" signal. Otherwise, it asserts the EDC error signal, which stops the transmission operation and interrupts the microprocessor 12. The bus interface 10 then stores information in its internal status register 11 which indicates that an EDC error was detected (Steps 166–167).

Once all the data bytes and associated parity bits requested by the requesting device have passed through the check sum circuit 24, the circuit produces a check sum symbol and sends the symbol to the receive/transmit circuit 20 for transmission (Steps 168–170). If the requesting device requests data which does not correspond to one or more complete sectors, the bus interface 10 includes only the requested data in its check sum calculation. However, it includes all the data in its EDC calculation in order to ensure that the requested data symbols are error-free. Thus the bus interface 10 may send the requested data to the transmit circuit 20 and then keep the circuit waiting for an indication of a valid EDC decode operation.

The receive/transmit circuit 20 either at this point, or earlier in parallel with the various on-going error protection operations, transmits the requested data bytes, parity bits and check sum symbol onto the data bus in byte-serial form. At the same time, actually after a short delay which corresponds to the propagation delay through the bus driving circuitry (not shown), the receive/transmit circuit 20 reads back the information it transmitted onto the bus. It then compares the read-back information with the information it tried to send (Steps 170–174). If everything matches, the circuit 20 continues its transmission operation (Steps 176, 180). Otherwise, the circuit 20 asserts a transmission-error signal, which interrupts the microprocessor 12 and stops the transmission operation. The bus interface 10 then stores in its status register information which indicates that it detected a transmission error (Steps 178–179). The microprocessor 12 can then re-read the appropriate sector and/or RAM buffers, attempt to again send the information on the bus or notify the requesting device that the data transfer can not be made, as appropriate.

Figure 5:
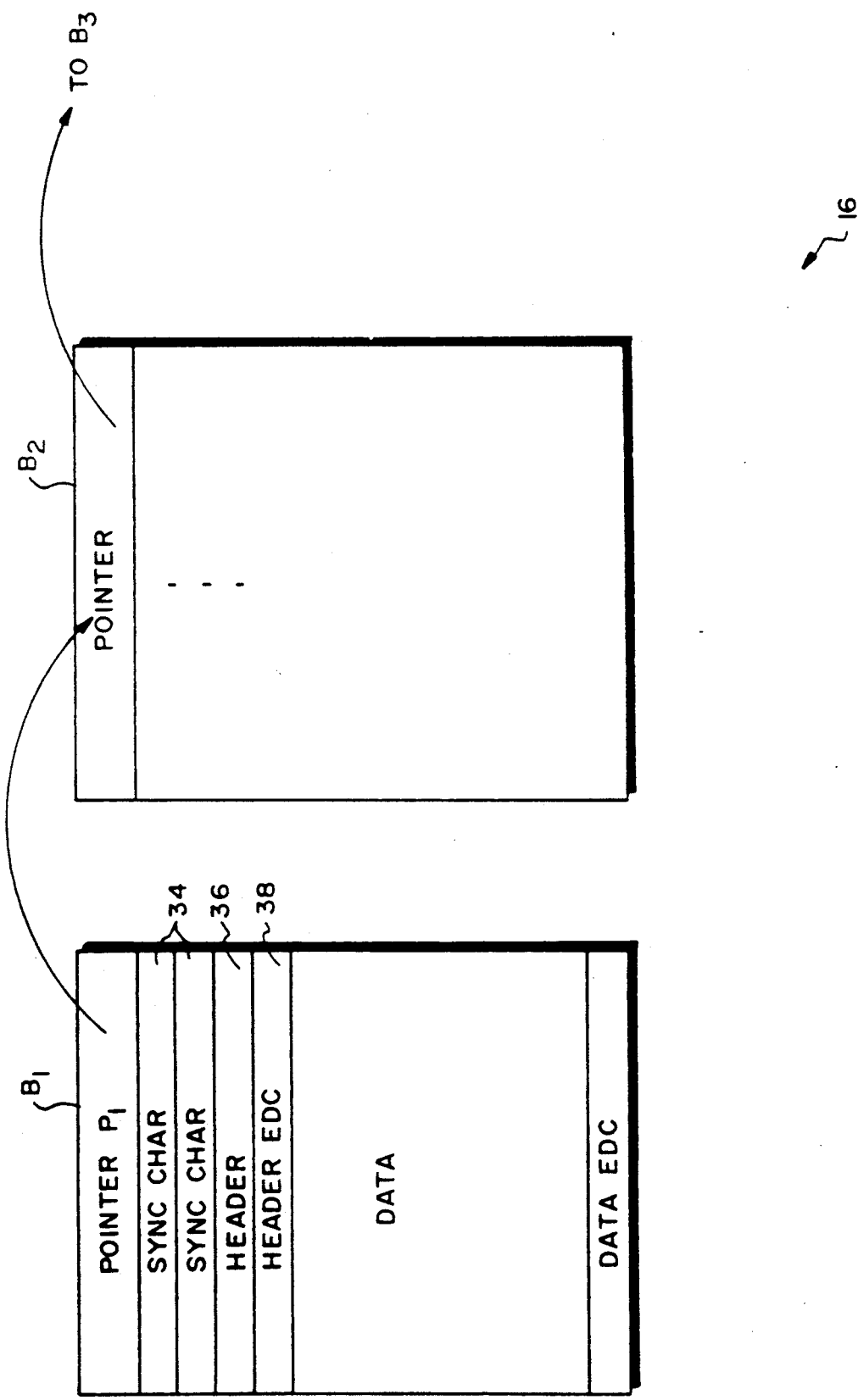
FIG. 5 is a block diagram of "linked" data buffers.

Referring now to FIG. 5, the RAM 16 stores data in a linked list of buffers. The data which are first received are stored in a first buffer $B_1$. When that buffer is full the next data are stored in a next buffer $B_2$, and so forth. The first buffer $B_1$ contains, along with the data, a pointer $p_1$ which points to the next buffer $B_2$. Buffer $B_2$ contains a pointer $p_2$ which points to the next buffer $B_3$, and so forth. Thus if the data from one packet are stored in "s" buffers, each of the buffers, except the last buffer, $B_s$, points to the next buffer in which the packet data are stored. If another packet has been received, the last buffer $B_s$ contains a pointer to the first buffer associated with this next packet. Accordingly, each of the buffers has a pointer which points to a next buffer associated with data later received over the bus. These buffers are thus "linked" together. If all the received data are stored, the last buffer contains either a "0" pointer, which indicates the end of a list, or a pointer to an un-used buffer, which indicates where the next received data will be stored. The pointers essentially order the buffers, such that the data are sent to a requesting device or to storage in the same order they were received by the RAM 16.

Each buffer $B_i$ includes, in addition to the data and a pointer $p_i$, one or more synchronization characters 34 and a header and associated header EDC symbols 36–38. The synchronization characters 34, which are written to the buffer at the same time that the data are written, signify a valid data buffer. They are patterns of binary ONES and ZEROS which enable the bus interface 10 to detect errors such as "stuckats", where one wire is held high or low, or two-bit "bridges", which are connections between two bits that force them to the same value. For example, the characters may be (in hexadecimal notation) AAAA5555H, and the bus interface examines the corresponding bits in each word which are "0"–"1" pairs to detect the aforementioned errors.

The header 36 in the first buffer associated with a particular packet contains packet related information such as source and destination addresses, length of packet, and so forth. The header is protected by header EDC symbols 38. If the bus interface 10 detects errors in the packet header, it asserts an error signal which interrupts the microprocessor 12 and ends the data transfer.

When a data transfer operation is complete, that is, an entire packet has been transferred from the bus interface 10 to the RAM 16, the bus interface over writes one of the synchronization characters in the first of the linked buffers associated with the transferred packet. The bus interface 10 thus writes information concerning the status of the transfer, for example, the number of bytes transferred and so forth, which is later used by the microprocessor 12 in assessing the transfer operation.

As set forth above, the bus interface 10 protects the data from the time it receives it from the data bus until it sends the data, in the appropriate format, through the storage interface 14 to RAM 16. Accordingly, errors introduced by bad connections, stuck bits, etc. in either the bus interface 10, the storage interface 14 or connections between them and/or the storage device 18 are detected either when the data is being converted to a format used by the storage devices or when the data is later retrieved and converted back to the format required by the bus. Thus the bus interface prevents erroneous data from being sent to a requesting device.

The bus interface 10 performs both write and retrieval operations. If errors are detected in a write operation, retrieval operations may continue, as long as the mechanism introducing errors into the write data does not also introduce errors into the retrieved data. Similarly, write operations may continue when errors are detected in retrieved data. A system controller may keep track of where errors are detected in a data transfer operation, in order to determine what is causing the errors. If, for example, the controller determines that data transmitted by the bus interface often includes errors which are discovered during the read-back phase of the transmission, it can test the data bus drivers and determine if one or more of them are faulty.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A data transmission system for transmitting data between a data bus, which transmits data in the form of multi-byte packets that include a plurality of data bytes and associated parity bits and a packet check sum symbol, and a data storage device, the system comprising:

A. a microprocessor for controlling a data transfer operation;
B. a bus interface which includes
  i. receiving means for receiving data from the data bus,
  ii. byte parity check means for detecting errors in received data bytes using received parity bits,
  iii. converter means for converting the data bytes to data words and associating with each data word a predetermined number of parity bits,
  iv. word parity check means for detecting errors in the data words using the associated parity bits,
  v. encoder/decoder means for encoding a predetermined number of data words and generating error detection symbols,
  vi. check sum error detecting means for detecting errors in a received multi-byte packet using the received packet check sum symbol,
  the bus interface asserting an error signal, interrupting the microprocessor and stopping a data transmission operation whenever it detects an error;
C. buffer means for receiving from the bus interface data in groups containing a predetermined number of data words and associated error detection symbols and storing each group in a designated buffer;
D. a storage interface for retrieving the data groups one at a time from the buffer means and encoding the retrieved data, using an error correction code, to generate error correction symbols; and
E. a storage device for receiving the data and error correction symbols from the storage interface and storing the data and the error correction symbols in a storage unit on a storage medium.

2. The data transmission system of claim 1, wherein the buffer means includes a plurality of buffers which are the size of a data storage unit associated with the storage media, the buffers being linked by pointers which point from one buffer to a next buffer, in the order in which the buffers are filled.

3. The data transmission system of claim 2, wherein the encoder/decoder means encodes the number of data words required for a data storage unit to generate the error detection symbols.

4. The data transmission system of claim 3, wherein the bus interface further includes means for generating all-zero bytes to zero-fill a buffer if the received data does not completely fill each of the buffers associated with the received packet, the bus interface generating associated parity bits and including the all-zero bytes in error detection symbol calculations.

5. The data transmission system of claim 4, wherein the microprocessor encodes the error detection symbols in a buffer by combining the error detection symbols with symbols associated with the address of a data storage unit designated to hold the data, before the error detection symbols are encoded using the error correction code.

6. The data transmission system of claim 5, wherein the system further includes:
A. in the buffer means, means for receiving data from the storage interface and storing the data in storage-unit sized groups in the buffers;
B. in the bus interface
  i. in the word parity check, generating means for generating parity bits for a data word retrieved from the buffer means,
  ii. in the converter, means for converting received data words to data bytes and associating with each data byte a parity bit generated by the word parity check, and
  iii. transmitting means for transmitting data on to the data bus in the form of multi-byte packets;
the bus interface checking the retrieved data words for errors using the retrieved error detection symbols before transmitting the data in the form of a multi-byte packet on to the data bus.

7. The data transmission system of claim 6, wherein the microprocessor removes from the error detection symbols in a buffer the address of the designated storage section associated with the data in the buffer before making the error detection symbols and the associated data words available to the bus interface.

8. The data transmission system of claim 7, wherein the bus interface also includes data read-back means for:
A. reading back data transmitted on the data bus by the transmitting means, and
B. comparing the read back data to the data transmitted by the transmitting means to determine if the transmitted data contains errors.

9. A method of transmitting data between a data bus and data storage devices, the data transmitting method comprising the steps of:
A. receiving from the data bus a data packet which includes a plurality of data bytes and associated parity bits and a packet check sum symbol;
B. detecting errors in the received data bytes using the receiving parity bits and asserting an error signal and interrupting a data transfer operation if any errors are detected;
C. converting the data bytes to data words and associating with each data word a predetermined number of received parity bits, if not errors are detected in the data bytes;
D. encoding a predetermined number of data words using an error detection code and generating error detection symbols;
E. detecting errors in the data words using the associated parity bits and asserting an error signal and interrupting the data transfer operation if any errors are detected;
F. storing the predetermined number of data words and associated error detection symbols in a buffer sized to hold one storage unit of data and linking this buffer by pointers with buffers associated with data from the same data packet or a later received packet, if not errors are detected in the predetermined number of data words;
G. repeating steps D-F;
H. when all the data bytes in a data packet have been encoded and stored, detecting errors in the data packet using the packet check sum symbol and asserting an error signal and interrupting the data transfer operation if any errors are detected;
I. encoding the data words and the associated error detection symbols in a first buffer associated with the data packet using an error correction code and generating error correction symbols;
J. storing the data words, associated error detection symbols and the error correction symbols in a storage unit of an associated storage device; and
K. repeating steps I and J until all the buffered data words have been stored in storage units of the associated storage device.

10. The method of transmitting data of claim 9, wherein the method further comprises the steps of:

L. retrieving from a storage unit of the associated data storage device, the stored data words and associated error detection and error correction symbols;

M. detecting and correctings errors in the data words and error detection symbols using the error correction symbols;

N. asserting an error signal and interrupting the data transfer operation if all detected errors can not be corrected;

O. generating for each data word a predetermined number of parity bits, if all detected errors are corrected;

P. detecting errors in the data words using the error detection symbols and asserting an error signal and interrupting the data transfer operation if any errors are detected;

Q. converting the data words to data bytes and associating with each data byte one of the parity bits associated with the corresponding data word, if no errors are detected;

R. repeating steps L-Q until the data associated with a data packet has been retrieved;

S. generating a check sum symbol for the data packet; and

T. transmitting the data packet on the data bus.

11. The method of transmitting data of claim 10, wherein the method further includes the step of combining the address of the storage medium unit designated to store the data with the error detection symbols associated with the data before encoding the symbols using the error correction code.

12. The method of transmitting data of claim 11, wherein the method still further includes the step of removing the address of the storage medium unit designated to store the data from the error detection symbols associated with data retrieved from the storage medium after decoding the symbols using the error correction code but before using the error detection symbols to detect errors in the retrieved data.

13. A method of transmitting data between data storage devices and a data bus, the data transmitting method comprising the steps of:

A. retrieving the data stored in a storage unit of an associated data storage device, the data consisting of a predetermined number of data words and associated error detection and error correction symbols.

B. detecting and correcting errors in the data words and error detection symbols using the error correction symbols;

C. asserting an error signal and interrupting the data transfer operation if all detected errors can not be corrected;

D. generating for each data word a predetermined number of parity bits, if all detected errors are corrected;

E. detecting errors in the data words using the error detection symbols and asserting an error signal and interrupting the data transfer operation if any errors are detected;

F. converting the data words to data bytes and associated with each data byte one of the parity bits associated with the corresponding data word, if no errors are detected;

G. repeating steps A-F until the data associated with a data packet has been retrieved;

H. generating a check sum symbol for the data packet; and

I. transmitting the data packet on the data bus.

14. The method of transmitting data of claim 13, wherein the method further includes the steps of:

J. reading back data transmitted on the data bus;

K. comparing the data which was read back to the data which was transmitted to determine if the data which was transmitted contains errors; and L. asserting an error signal and interrupting the data transfer operation if an error is detected.

15. The method of transmitting data of claim 14, wherein the method still further includes the step of combining the address of the storage medium unit designated to store the data with the error detection symbols associated with the data before encoding the symbols using the error detection code.

16. The method of transmitting data of claim 15, wherein the method further includes A. in the step of calculating a check sum, calculating the check sum for only the data requested by a receiving device;

B. in the step of transmitting the data packet, transmitting as part of the packet the requested data and not transmitting as part of the packet the remaining data retrieved from the storage unit.

* * * * *

UNITED STATES PATENT AND TRADEMARK OFFICE
CERTIFICATE OF CORRECTION

PATENT NO. : 5,182,752
DATED : Jan. 26, 1993
INVENTOR(S) : John E. DeRoo, et al

It is certified that error appears in the above-indentified patent and that said Letters Patent is hereby corrected as shown below:

On title page, item [75] "Ann Solli" should read --Anne Solli--.

Signed and Sealed this

Sixth Day of September, 1994

Attest:

BRUCE LEHMAN

*Attesting Officer*  *Commissioner of Patents and Trademarks*